United States Patent [19]

Funk et al.

[11] 4,164,120
[45] Aug. 14, 1979

[54] CONTROL DEVICE FOR COMBUSTION ENGINE

[75] Inventors: Norbert J. Funk, Grosswallstadt; Siegfried Püschel, Aschaffenburg, both of Fed. Rep. of Germany

[73] Assignee: Linde Aktiengesellschaft, Wiesbaden, Fed. Rep. of Germany

[21] Appl. No.: 862,503

[22] Filed: Dec. 20, 1977

[30] Foreign Application Priority Data

Dec. 23, 1976 [DE] Fed. Rep. of Germany ....... 2658698

[51] Int. Cl.² ...................... F15B 21/08; F02D 11/10
[52] U.S. Cl. ....................................... 60/431; 60/445; 60/DIG. 2; 123/102; 318/480

[58] Field of Search ................. 60/338, 390, 420, 423, 60/431, 445, DIG. 2; 123/98, 102; 318/480; 180/105 F; 74/513

[56] References Cited

U.S. PATENT DOCUMENTS

| 3,349,785 | 10/1967 | Duffy | 318/480 X |
| 3,808,485 | 4/1974 | Sakai et al. | 318/480 |

Primary Examiner—Edgar W. Geoghegan

[57] ABSTRACT

The present invention relates to a control device for a combustion engine and particularly to a combustion engine for use with hydrostatic transmissions particularly as used in a fork lift truck.

11 Claims, 4 Drawing Figures

CONTROL DEVICE FOR COMBUSTION ENGINE

BACKGROUND OF THE INVENTION

In vehicles such as fork lift trucks, an internal combustion engine has been controlled by the use of a potentiometer connected with an operator's pedal to give an electric voltage signal to the control element of the combustion engine. Such an arrangement has a disadvantage in that potentiometers are very sensitive to shock and other mechanical influences in the zone of the pedal of the vehicle. In this area, only the strongest possible elements should be utilized. Also, potentiometers have the disadvantage that it is difficult to vary the magnitude of the signals in dependency upon the operation of the pedal, particularly when it is to be varied in a non-linear manner relative to pedal travel.

In certain applications for controlling the travel speed of a vehicle with electric drive with an operational element which can be operated at will, it is known to use a light responsive modulator to vary the magnitude of voltage or current for the drive. The known modulating device comprises a light source and a photosensitive element and a movable shutter between the light source and photosensitive element which controls the output voltage or current in accordance with the position of the shutter, the light received by the photosensitive element varying with the shutter position. While this type of device has been known in connection with the control of an electric drive, it has not been recognized that it will be desirable to use this type of element in the control of an internal combustion engine, particularly an internal combustion engine for driving a hydrostatic transmission as is commonly used in fork lift trucks. In the control of an internal combustion engine the use of the light responsive modulator enables the separation of electrically sensitive parts from the mechanical parts connected with the driving pedal and on which shock forces may be exerted in vehicles driven with internal combustion engines.

SUMMARY OF THE INVENTION

The present invention involves the use of a control device such as utilized in electric drives to drive a combustion engine to provide more reliable operation of the engine by reason of the contactless-wear-free-operating light unit. Moreover, the light control enables the internal combustion engine to be readily controlled in accordance with pedal movement and to achieve a non-linear output for pedal travel. The latter is particularly important in drive assemblies where the combustion engine drives a hydrostatic gear and the driving pedal or other element operable at will should adjust not only the combustion engine but also the hydrostatic gear. My control system readily enables the pedal travel to first increase the speed of the engine together with the power of the hydrostatic gear and after the engine reaches a predetermined RPM to hold the engine speed substantially constant and to vary the drive from the pedal or other control element by varying the hydrostatic gear with additional movement of the control element. This gives two different operating zones of power.

The light responsive control in a combustion engine is also readily adaptable to vehicles where the hydrostatic gear has a neutral position from which it moves in one direction to cause the drive to proceed in a forward direction and in the opposite direction to cause the drive to proceed in a reverse direction. The operation in this manner is easily accomplished, as for example by fully blocking the light to the photosensitive element in neutral or allowing full light in neutral and then varying the amount of light by movement of the shutter in either direction. In the former case, the shutter may be of a size to completely block the light of transmission until a movement occurs while in the latter case, the shutter has an opening to allow the maximum amount of light to be transmitted in neutral and then proceeds to block the light when operated in either direction from its neutral position.

Moreover, one aspect of the invention involves the use of two shutter elements in a light stream which can be separately controlled to control the signal from the light modulator. This is particularly suitable for use in fork lift trucks where the pedal may control the drive of the unit and another operator's control element may effect control of the element for lift purposes. In this mode of operation, the shutter will transmit full light in its off position so that either shutter can be moved to vary the light and the one with the greatest movement will control the magnitude of the signal from the light modulator. The output signal from the modulator may easily be a desired function of the movement of the pedal or the control element by varying the shutter design relative to the configuration of the light beam into which it moves.

DESCRIPTION OF THE DRAWINGS

A preferred embodiment of the present invention is described with reference to the accompanying drawings, forming a part of this specification for the disclosure thereof and in which:

Referring to FIG. 1, a driving pedal 1 represented by the block 1 is connected through a lever 2 with a light-responsive modulator 3 for producing an electrical signal in accordance with the travel of the pedal 1. The electrical signal from the light modulator-responsive is an analog signal which is applied to an electronic or electrical regulator 5 which regulates the operation of an internal combustion engine 7, such as gasoline or fuel gas engine, through a line 6. A feedback signal from the engine to the regulator 5 is accomplished through line 8. If the combustion engine is a gasoline engine, the signal from the regulator 5 will control the energization of an electron magnet, or solenoid, for variably operating the throttle valve of the engine to control engine speed. The feedback signal is preferably derived as the function of the number of ignitions in a certain cylinder. In the regulator 5, the feedback signal from the engine is compared with the analog signal from the light modulator and the output of the regulator will be an error signal which will maintain correspondence between the analog signal from the light modulator and the feedback signal from the engine. Such regulators are well known in the art including regulators to compare an analog input signal with a feedback pulse signal in the form of pulses as received from the ignition circuit. In the case of feedback pulses, the feedback pulses may be integrated over a unit of time to provide an analog signal which is compared with the analog signal from the light modulator by use of well known and conventional techniques.

Figure 1:
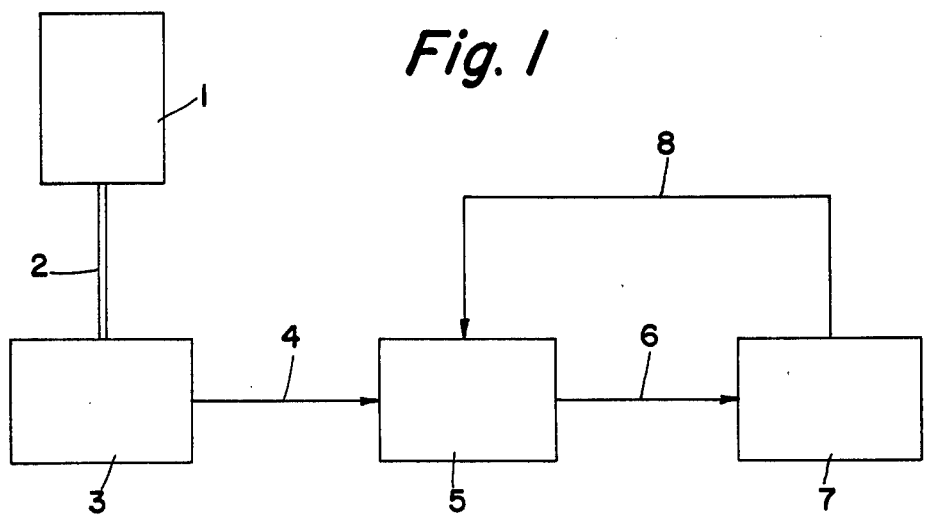
FIG. 1 is a diagrammatic showing of a system for effecting the control of a combustion engine.
Figure 2:
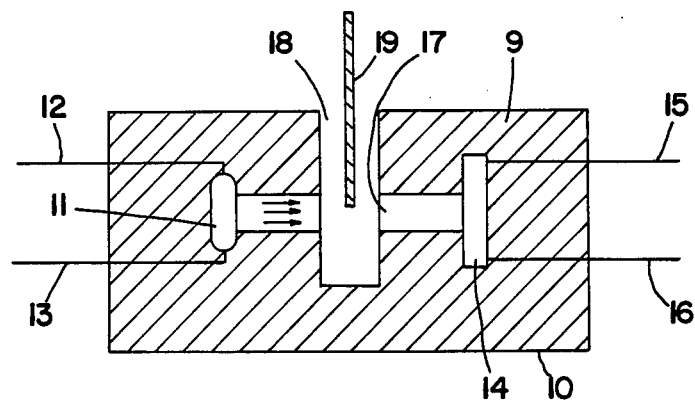
FIG. 2 shows in section the light responsive modulator for producing an electric signal used in the control of the combustion engine.

The light responsive modulator preferably comprises a housing or block 9 of cold pourable plastic which is glued at its base surface 10 to a base plate for the electrical control. Cast into the block 9 is a light source, preferably a luminescent diode (LED 11), which is connected through two connections 12 and 13 to a battery.

On the other side of the block 9 opposite the luminescent diode 11 and cast into the same block is a photoresistance 14 which is connected to two signal output electrical lines 15 and 16. The output lines are to the electromagnet directly or through an amplifier. It is understood that a voltage source may be connected with the photoresistance so that the light varies the output signal, voltage or current or both. A continuous bore extends between the luminous diode 11 and the photoresistance 14 so that a stream of light coming from the luminescent diode through the bore strikes the photoresistance 14.

To modulate the light striking the photoresistance, the block 9 has a slit 18 into which a shutter 19 is positioned. The shutter 19 can be moved in accordance with pedal travel, and according to the depth to which the shutter is moved into the slit 18 and the light stream, the shutter will block a corresponding part of the light stream from the luminescent diode 11 and vary the current flow through the photoresistance 14. Preferably, the slit accommodates additional shutter movement after it blocks the light stream. The shutter may block the stream in its low or idle RPM position and then move outwardly of the slit as the pedal is moved.

Figure 3:
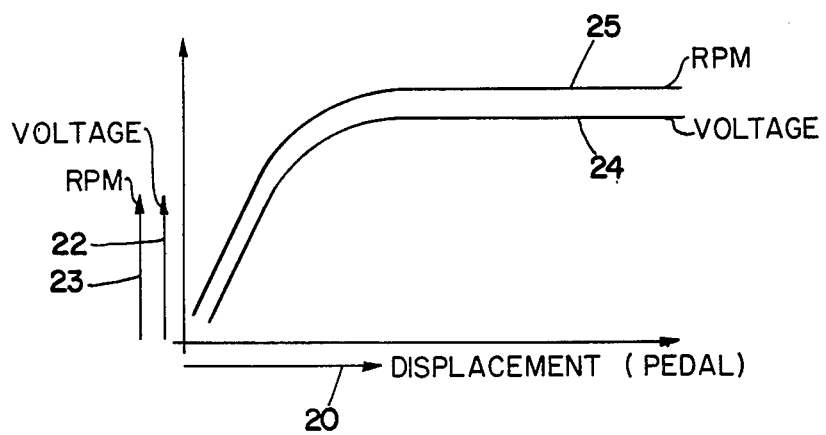
FIG. 3 shows the control to be obtained for both the electrical output and RPM of the engine in accordance with pedal travel.

Referring to FIG. 3, the distance of movement of the pedal is plotted on the abscissa and the control voltage output from the light-responsive modulator is plotted on the ordinate (arrow 22) as is also the RPM of the engine (arrow 23). Curve 25 represents the engine RPM while curve 24 represents the magnitude of the control signal with pedal travel.

A mechanical adjusting mechanism may be provided between the pedal and shutter to adjust and position the shutter relative to the pedal, e.g., a link of adjustable length or an adjustable cam.

Figure 4:
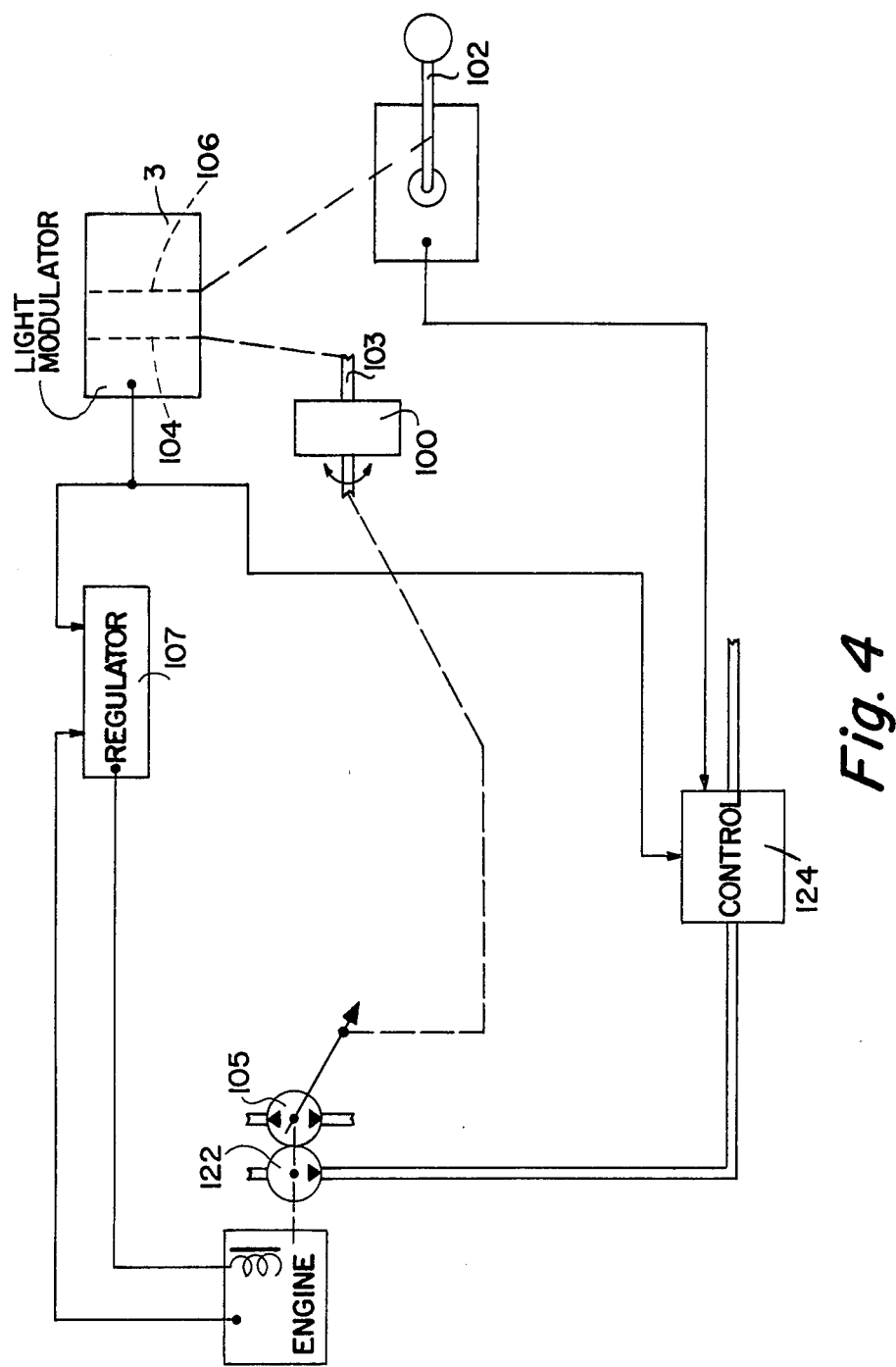
FIG. 4 shows a diagrammatically illustrated system in which a light responsive modulator has two shutters, one controlled by a pedal and the other controlled by a control lever.

Referring to FIG. 4, a system is diagrammatically illustrated where the light-responsive modulator 3 has two shutters, one controlled by a pedal 100 and another controlled by a control lever 102. Pedal 100 is a rocker type pedal having a neutral position from which it can be rocked in either direction to control forward and reverse movement of a fork lift or other vehicle. The pedal rocks a shaft 103 which varies the position of the shutter 104 of the light responsive modulator. The shutter 104 has a central opening passing light when the pedal is in neutral but immediately starts to block the light stream on movement in either direction. The shaft is also connected in a conventional manner to vary the setting of a reversible hydrostatic pump 105 from a neutral position in accordance with pedal travel and direction of pedal movement from neutral. The lever 102 controls a shutter 106 for purposes of controlling accessories, for example, the lifting of forks of a fork lift truck. The output from the light responsive module is connected to a regulator 107 to control the engine as described in the first described embodiment. The hydrostatic pump 105 is a reversible variable displacement pump and is part of a conventional hydrostatic transmission for a fork lift truck. In designing the operation of the system, the shutter may be designed to block the stream so that the engine reaches its maximum power prior to the time that the hydrostatic pump has reached its maximum adjustment. Then continued movement of the pedal will have no effect on engine RPM but will increase the setting of the pump. Thus, two zones of operation are provided. In FIG. 3, the second zone would be on the level part of curve 25. It will be understood that the shutter slit will accommodate the extra travel of the shutter after blocking the light stream or the mechanical linkage to the shutter may do so.

FIG. 4 also illustrates the use of the second shutter 106 in the light modulator 3 to control accessories from a pump 122 also driven by the engine. The output of the pump 122 is connected to fluid control mechanism 124 which operates in accordance with the signal received from the light modulator 3. The control 124 has an electrical enable signal derived from the operation of lever 102 from its neutral position. If both shutters are operating simultaneously, the one which requires the most power will effect control of the engine.

We claim:

1. In a control system for an internal combustion engine for use with fork trucks and other vehicles, the engine having an electrical element for controlling the RPM of the engine, an operator control element movable to effect control of the RPM of the engine, electrical circuitry for variably energizing said electrical element for controlling the RPM of the engine comprising a modulator for controlling the energization of said electrical element in response to the position of said operator element, said modulator comprising a light source for producing a stream of light, a photosensitive element connected into an output circuit to control the energization of said electrical element, and a shutter positioned between said light source and said photosensitive element and movable to vary the amount of light striking said photosensitive element from said light source, and means connecting said shutter to said operator control element to move the shutter to vary the light beam in accordance with movement of the operator control element.

2. In a control system as defined in claim 1 wherein said light source is a luminescent diode.

3. In a control system as defined in claim 1 wherein said photosensitive element is a photoresistance.

4. In a control system as defined in claim 1 wherein said light source is a luminescent diode and said photosensitive element is a photoresistance, and said photoresistance and said diode have a common housing comprising a block having a light transmitting path between said photoresistance and said diode, said block having a slit therein transversely of said path in which the shutter moves.

5. In a control system as defined in claim 1 wherein said vehicle includes a hydrostatic transmission comprising a variable displacement pump including a displacement control element, means for operating said displacement control element in accordance with movement of said operator control element to control the displacement of the pump, said shutter being connected to said operator control element to vary the RPM of the engine to a maximum prior to full movement of said control element and said means connecting said displacement control element to said operator control element effecting continued movement of said displacement control element in accordance with additional movement of said operator control element.

6. In a control system for an internal combustion engine as defined in claim 1 wherein a second shutter is disposed in said modulator for varying the light transmitted from said light source to said photosensitive element, and a second control element is provided for varying the position of said second shutter independently of said first shutter to control the RPM of said engine.

7. In a control system for an internal combustion engine as defined in claim 6 wherein said combustion engine is a drive for a fork lift truck and said operator control element regulates the speed of said engine for driving the vehicle and said second control element regulates the speed of said engine for effecting the operation of lift forks or similar accessory of the fork lift truck.

8. In a control system as defined in claim 1 wherein means for connecting said operator control element to said shutter comprises means for adjusting the position of the shutter relative to the position of the operator control element.

9. The method of controlling the driving speed of a vehicle driven by a combustion engine which comprises varying the amount of light received by a photosensitive element from a light source to provide an electrical signal which varies in accordance with the amount of light received by the photosensitive element, and utilizing said signal to control the energization of an electrical element for regulating the RPM of the combustion engine.

10. A method as defined in claim 9 where the engine is an internal combustion engine driven by fuel gas and the electric signal regulates the setting of a throttle valve for the engine.

11. A method according to claim 9 in which an operator element is moved to vary a shutter which varies the amount of light received by the photosensitive element and the movement of the operator control element varies the setting of a hydrostatic transmission pump for supplying hydraulic fluid to a motor for driving the vehicle.

* * * * *